(12) United States Patent
Harris et al.

(10) Patent No.: US 11,214,198 B2
(45) Date of Patent: Jan. 4, 2022

(54) COMBINED ACTUATOR FOR MIRROR FOLDING AND LIFTING, REAR VIEW DEVICE AND VEHICLE

(71) Applicant: MOTHERSON INNOVATIONS COMPANY LIMITED, London (GB)

(72) Inventors: Tom Harris, Portchester (GB); Gareth Aspden, Portchester (GB); Stephen Beecher, Portchester (GB); Levente Kurti, Portchester (GB); Warwick Jones, Portchester (GB); Dong Myeong Park, Portchester (GB)

(73) Assignee: Motherson Innovations Company Limited, London (GB)

( * ) Notice: Subject to any disclaimer, the term of this patent is extended or adjusted under 35 U.S.C. 154(b) by 0 days.

(21) Appl. No.: 16/992,428

(22) Filed: Aug. 13, 2020

(65) Prior Publication Data

US 2021/0046874 A1 Feb. 18, 2021

(30) Foreign Application Priority Data

Aug. 16, 2019 (DE) ...................... 10 2019 122 105.6

(51) Int. Cl.
| | | |
|---|---|---|
| *B60R 1/074* | (2006.01) | |
| *F16D 7/02* | (2006.01) | |
| *F16H 25/16* | (2006.01) | |

(52) U.S. Cl.
CPC .............. *B60R 1/074* (2013.01); *F16D 7/024* (2013.01); *F16H 25/16* (2013.01)

(58) Field of Classification Search
CPC ........... B60R 1/074; B60R 1/07; B60R 1/072; B60R 1/06; B60R 1/076; B60R 1/0617;
(Continued)

(56) References Cited

U.S. PATENT DOCUMENTS

| 9,987,987 B2 * | 6/2018 | van Stiphout .......... B60R 1/074 |
| 2006/0119960 A1 * | 6/2006 | Yoshida .................. B60R 1/074 |
| | | 359/871 |

(Continued)

FOREIGN PATENT DOCUMENTS

| DE | 69822701 T2 | 1/2005 |
| EP | 2574504 A1 | 4/2013 |
| WO | WO 2020/174108 A1 | 9/2020 |

OTHER PUBLICATIONS

Great Britain Search Report dated Jan. 21, 2021 of application No. GB 2012724.7.

(Continued)

*Primary Examiner* — Jade R Chwasz
(74) *Attorney, Agent, or Firm* — Jones Day (57) ABSTRACT

An actuator for a rear view device of a vehicle, a rear view device and a vehicle with such an actuator includes a body defining a folding axis for a rear view device of a vehicle, an actuator housing being rotatably and axially displaceably borne by the body and a drive assembly being supported by the actuator housing and being configured for automatically rotating the actuator housing relative to the body about the folding axis between a first angular position and a second angular position and for axially displacing the actuator housing relative to the body along the folding axis between a first axial position and a second axial position.

29 Claims, 6 Drawing Sheets

(58) Field of Classification Search
CPC . B60R 1/0612; B60R 2011/009; F16D 7/024; F16H 25/16
USPC ........................................................ 359/841
See application file for complete search history.

(56) References Cited

U.S. PATENT DOCUMENTS

2007/0084707 A1\* 4/2007 van den Brink ........ B60R 1/074
                                                            200/329
2013/0321941 A1    12/2013 Van Stiphout et al.

OTHER PUBLICATIONS

German Office Action dated Feb. 14, 2020 of German application No. DE 102019122105.6.

\* cited by examiner

COMBINED ACTUATOR FOR MIRROR FOLDING AND LIFTING, REAR VIEW DEVICE AND VEHICLE

CROSS-REFERENCE TO RELATED APPLICATION

This application claims the benefit of foreign priority to German Patent Application No. DE 10 2019 122 105.6, filed Aug. 16, 2019, which is hereby incorporated by reference in its entirety for all purposes.

BACKGROUND

1. Field of the Invention

The invention relates to a powerfold actuator for a rear view device of a vehicle, the powerfold actuator providing a fold and lift function, to a rear view device comprising such actuator and to a vehicle comprising at least one of such rear view device.

2. Related Art

A rear view device of a vehicle is usually mounted on a base frame arranged on the exterior of a vehicle door and allows a rear-view to a driver of the vehicle. Most rear view devices have a so-called powerfold actuator for automatically unfolding and folding the rear view device. Usually, the powerfold actuator has an actuator base to be mounted to the base frame, an actuator housing supporting a mirror housing being rotatably coupled to the actuator base and a drive assembly being configured for automatically pivoting the actuator housing relative to the actuator base about a folding axis between a first angular position which is a folded position of the rear view device and a second angular position which is an unfolded position of the rear view device.

In the unfolded position, the rear view device protrudes from the vehicle door and extends substantially transverse relative to the forward driving direction of the vehicle. As the rear view device is in the unfolded position during a drive of the vehicle the unfolded position is often referred to as a drive position.

In the folded position, the rear view device is aligned with the vehicle door and extends opposite to the forward driving direction of the vehicle. As the rear view device is in the folded position during a parking of the vehicle the folded position is often referred to as a parking position.

While the powerfold actuator enables the rear view device for unfolding and folding automatically, the powerfold actuator should as well allow for manually pivoting the rear view device between the first angular position and the second angular position, for instance, in case of a defect or a malfunction of the powerfold actuator.

Additionally, the powerfold actuator is usually required to allow for manually over-folding the rear view device, i.e. for manually pivoting the rear view device into a third angular position beyond the second angular position. The third angular position is a so-called over-folded position of the rear view device.

In the over-folded position, the rear view device is substantially aligned with the vehicle door as it is in the folded position. However, in the over-folded position the rear view device extends in the forward driving direction of the vehicle, i.e. the orientation of the rear view device in the over-folded position is substantially opposite to the orientation of the rear view device in the folded position. By pivoting from the unfolded position into the over-folded position, the unfolded rear view device may yield to a moment working in the forward driving direction of the vehicle in order to avoid breaking of the rear view device or the powerfold actuator due to the moment.

Another requirement to be met by a rear view device is causing as little wind noise as possible during a drive of the vehicle, i.e. in the unfolded position of the rear view device, and pivoting very easily thereby producing as little wear as possible. While pivoting of the rear view device is very easy and produces little wear if there is a gap between the actuator housing and the actuator base, it is just the gap between the actuator housing and the actuator base to cause noise when wind is applied thereto.

In order to overcome these contravening issues, the powerfold actuator may have a lift mechanism. The lift mechanism is configured to axially displace the actuator housing relative to the actuator base along the folding axis between a first axial position, the actuator housing therein abutting the actuator base without a gap between the actuator housing and the actuator base, and a second axial position, the actuator housing therein being at a distance from the actuator base and forming a gap between the actuator housing and the actuator base. The lift mechanism may lower the actuator housing in the drive position of the rear view device and lift the actuator housing for any pivoting action.

The lift mechanism may have one or more pairs of circular cam tracks. The cam tracks of each pair are arranged to face each other and configured to more or less engage each other dependent on their relative angular position. Thus, rotating the cam tracks of a pair relative to each other causes an axial distance between the cam tracks to vary, the axial distance variation providing the actuator housing with the desired axial displacement effect.

The drive assembly may integrate the lift mechanism and provide a combined fold and lift function for the powerfold actuator. However, providing a powerfold actuator with a lift mechanism usually results in a high mass and a high mechanical complexity of the powerfold actuator.

From EP 2 574 504 A1, a car outside mirror device is known to have a shaft, a transmission housing, a set of a motor, a deceleration mechanism and a clutch mechanism, an electrically driven rotation range limiting mechanism and a holding mechanism. The holding mechanism is provided between a shaft and a housing. This holding mechanism is arranged in a non-contact state with respect to the shaft and the housing in an area where a mirror assembly rotates between a use location and a storage location, and is arranged in a contact state with respect to the shaft and the housing to hold the mirror assembly at the use location when the mirror assembly is positioned at the use location. As a result, the present invention is compatible with preventing the application of a load to an electrically driven storage unit and holding the mirror assembly in a manner so as to be free of vibration.

US 2013/0321941 A1 teaches an adjustment tool for an exterior mirror unit for a vehicle. The adjustment instrument comprises a housing that is pivotally adjustable between a parking position, a drive position and a flip position with respect to a base. The adjusting instrument further comprises an electric drive unit provided in the housing and a drive ring for coupling to the electric drive unit.

From DE 698 22 701 T2, an exterior rear-view mirror with a mirror head is known, which is rotatably mounted on a pivot that is attached to a mounting bracket. A catch holds the mirror head in a desired position relative to the mounting bracket. A spring acts between the mounting bracket and the mirror head to hold the latch in its locked position. An actuator is driven by an electric motor drive so that during initial operation, while the latch is engaged to resist rotation of the mirror head, a force is applied to the spring causing movement of the mirror head to release the latch. During subsequent operation, the actuator rotates the mirror head around the journal.

The US 2007/0084707 A1 teaches a hinge actuator comprising a first part that is pivotally connected to a second part and an electric drive for pivoting the parts relative to each other. The first and second parts comprise stops that cooperate in a first pivoting direction to define a position of the actuator parts. A coupling is provided between the first and second parts, so that in a first position the first part and the second part are connected via the drive and, driven by the drive, can be pivoted relative to each other, and a second position in which the first part and the second part are not connected via the drive and can be manually pivoted relative to each other.

It is desirable to provide a powerfold actuator for a rear view device of a vehicle which allows for pivoting manually, supports over-folding, has a lift mechanism and, at the same time, has a low mass and a low complexity.

SUMMARY

In an aspect, a rear view device actuator having an automatic fold and lift function which has a low mass and a low complexity is provided.

In an aspect, an actuator for a rear view device of a vehicle includes a body defining a folding axis for the rear view device relative to the vehicle bodywork, an actuator housing being rotatably and axially displaceably borne by the body and a drive assembly being supported by the actuator housing and being configured for automatically rotating the actuator housing relative to the body about the folding axis between a first angular position and a second angular position and for axially displacing the actuator housing relative to the body along the folding axis between a first axial position and a second axial position, where the drive assembly has a clutch gear being rotatably borne by the body and axially coupled to the actuator housing. The drive assembly is configured to apply a moment to the clutch gear relative about the folding axis thus providing for an automatic relative rotation of the actuator housing and the body, i.e. the drive assembly provides the actuator with a fold function. Additionally, the drive assembly provides the actuator with a lift function. The first angular position and the second angular position correspond to a folded position and an unfolded position of the rear view device, respectively. The first axial position and the second axial position correspond to a lifted position and a lowered position of the actuator housing, respectively.

A rear view device may comprise one or more mirror elements or one or more cameras providing views of a rear traffic.

Further, a clutch gear of the drive assembly is rotatably and axially displaceably borne by the body and has at least one housing catch axially coupling the clutch gear to the actuator housing while allowing for a relative rotation of the clutch gear and the actuator housing. The clutch gear is formed as a ring with an outer helical gearing and is penetrated by the body. The at least one housing catch allows the clutch gear for applying an axial force to the actuator housing, i.e. the clutch gear immediately displaces the actuator housing in an axial direction while the clutch gear itself is displaced in the axial direction. In other words, the at least one housing catch of the clutch gear makes the actuator housing inevitably follow any axial displacement of the clutch gear. On the other hand, the at least one housing clutch allows the clutch gear for rotating relative to the actuator housing. This rotational degree of freedom enables the clutch gear for keeping on rotating after the actuator housing has reached the second angular position, i.e. the out-folded position of the rear view device, and stopped pivoting. The continuing rotation of the clutch gear may readily control the axial displacement of the actuator housing.

In an embodiment, the body and the actuator housing each have a folding cam track extending peripherally and interacting with each other for defining the second angular position, the folding cam track of the body having a folding stop detent with a stop shoulder and the folding cam track of the actuator housing having a folding stop detent. The rotation of the actuator housing relative to the body stops when the folding stop catch of the actuator housing peripherally abuts the stop shoulder of the folding stop catch of the body. Of course, the folding cam track of the body and the folding cam track of the actuator housing are each torque-proof connected to the body and the actuator housing, respectively.

Furthermore, it is preferred that the body and the clutch gear each have a lifting cam track extending peripherally and interacting with each other for defining a lifting stop and a lifting stroke, the lifting cam track of the body having a lifting stop catch and the lifting cam track of the clutch gear having a lifting stop detent. The lifting cam tracks are configured for controlling the axial displacement of the actuator housing relative to the body. Both the lifting stop catch and the lifting stop detent may have corresponding inclined edges, i.e. peripheral slopes, in order to ease engaging and disengaging and provide a smooth transition between engagement and disengagement. The drive assembly is configured for automatically stopping operation when the lifting stop catch reaches the lifting stop detent. For instance, this automatic operation stop may be accomplished by monitoring an electric current used by the drive assembly. When the lifting stop catch and the lifting stop detent engage, a moment counteracting the moment provided by the drive assembly is created which makes the electric current of the drive assembly increase. The electric current of the drive assembly may be interrupted on a rise of the electric current.

In advantageous embodiments, angular positions of the stop shoulder of the folding stop detent and the lifting stop catch are distant from each other for providing a two-step fold and lift operation of the actuator. The angular distance ensures the lifting and the folding to be carried out one after the other and vice versa.

The lifting cam tracks may be radially arranged within the folding cam tracks and/or the lifting cam tracks and the folding cam tracks are axially arranged at the same position. These relative arrangements of the folding cam tracks and the lifting cam tracks allow for a high compactness of the actuator.

In some embodiments, the folding cam track of the body and the lifting cam track of the body are formed on a shaft cam ring of the drive assembly or wherein the folding cam track of the body is formed on a shaft cam ring of the drive assembly and the lifting cam track of the body is formed on the body. Generally speaking, the cam tracks of the body may be formed on a single part of the drive assembly or on separate parts which allows for an extensive structural flexibility of the actuator. Of course, the cam tracks of the body may be formed not only like this, but equivalently in many different ways which will be appreciated by the skilled person.

The shaft cam ring may be torque-proof connected to the body by means of a plurality of angular positioning detents of the shaft cam ring engaging a plurality of angular positioning catches of the body. The angular positioning detents and the angular positioning catches are very easy to provide. They may have rectangular shapes, respectively. Of course, there are many equivalent different angular positioning means for torque-proof connecting the shaft cam ring to the body which will be appreciated by the person skilled in the art.

The body preferably has a base section and a shaft section being arranged axially adjacent to the body section, the base section having at least one base fastening means for connecting the body to a base frame of a door of a vehicle and/or the shaft section extending through a through-hole of the actuator housing. The base section and/or the shaft section may comprise a plastic or consist of a plastic and may have an at least substantially cylindrical shape and differ by a diameter thereof. Advantageously, the base section has a larger diameter than the shaft section in order to provide, at the same time, a reliable connection to the base frame and a high compactness of the actuator. The at least one base fastening means may be configured as one or more threaded bores in the base section which a correspondent number of screws may be screwed into.

In still other embodiments, the base section and the shaft section are integrally formed. Alternatively, the body may be configured two-part and the base section and the shaft section are separately formed and connected by a bayonet lock, the base section having the bayonet mount and the shaft section having the bayonet catch or vice versa. The body may be manufactured by 2K injection molding, laser melting or the like. The skilled person may readily choose from these alternative configurations of the body of the actuator dependent on structural or manufacturing requirements.

The drive assembly preferably has a drive train for automatically rotating the actuator housing about the folding axis and displacing the actuator housing along the folding axis. The drive train allows for setting a desired rotational speed of the actuator and for flexibly arranging the drive assembly within the actuator housing.

In many embodiments, the drive train has an electric motor, a printed circuit board mounted and electrically connected to the electric motor and, for rotatably coupling the clutch gear to the electric motor, a first worm gear being torque-proof fastened to a drive shaft of the electric motor, a second worm gear being engaged with the clutch gear, and a spur gear being engaged with the first worm gear and torque-proof fastened to the second worm gear. The drive shaft of the electric motor provides a moment which is transformed and forwarded to the clutch gear by the worm gears and the spur gear. The electric motor and gearings of the worm gears, the spur gear and the clutch gear may be chosen to result in the desired rotational speed of the clutch gear.

The drive shaft of the electric motor may extend parallel to the folding axis, and the second worm gear and the spur gear are rotatable about an axis extending perpendicular to both the drive shaft and the folding axis. This arrangement of the drive train allows for a high compactness of the actuator.

The electric motor may be supported by a support element of the actuator housing, the support element being fastened to a bottom section of the actuator housing. While the arrangement of the drive train as a whole is supported by the actuator housing the electric motor is advantageously supported additionally as the electric motor has the largest mass among the parts of the drive assembly.

In some embodiments, the first worm gear comprises a plastic or consists thereof and/or the spur gear comprises a plastic or consists thereof and/or the second worm gear comprises a metal or consists thereof and/or the clutch gear comprises a metal and/or a plastic or consists of a metal and/or a plastic. The skilled person may choose from a plurality of materials in order to form the parts of the drive train dependent on wear and mass requirements.

The drive assembly may be configured to rotate the drive shaft of the electric motor at an angular speed in a range from 5500 rpm (rotations per minute) to 9500 rpm, and/or the drive train may have a gear ratio in a range from 750:1 to 2000:1, and/or the drive assembly may be configured to rotate the clutch gear at an angular speed in a range from 10°/s to 60°/s. With said ranges and values an automatic folding or unfolding of the rear view device is achieved within about 2 seconds, respectively, which is reasonable in most practical cases.

A first angular difference between the first angular position and the second angular position is preferably in a range from 20° to 90°. Thus, the first angular position and the second angular position can have less than a right angle in between. While in the folded position the rear view device is substantially aligned parallel to a longitudinal direction of the vehicle, said angular difference of the rear view device provides a driver of the vehicle with an optimal rear-view.

The actuator preferably is configured for manually rotating the actuator housing between the second angular position and a third angular position, wherein a second angular difference between the first angular position and the third angular position can be up to 240° and/or for manually rotating the actuator housing between the first angular position and the second angular position. The third angular position is the over-folded position of the actuator. The actuator, thus, is able to yield to a moment applied to the rear view device in the forward driving direction of the vehicle in order to prevent breaking of the rear view device or the actuator.

The drive assembly may have a retainer ring, a clutch ring and a spring, the spring being supported between the retainer ring and the clutch ring, with the spring in particular being in form of a wave spring. These further parts complete the configuration of the drive assembly, wherein the clutch ring, the clutch gear and the shaft cam ring are axially arranged in that order between the retainer ring and the base section of the body. The spring is axially arranged between the retainer ring and the clutch ring.

The retainer ring may be axially fastened to the shaft section by a bayonet lock, the shaft section having a bayonet mount at an end of the shaft section opposite to the base section and the retainer ring having a bayonet catch, or may be axially fastened to the shaft section by press-fitting, the shaft section having a peripheral groove and the retainer ring having a plurality of catches engaging the groove. With the retainer ring axially fastened to the shaft section, the clutch ring, the clutch gear and the shaft cam ring are biased by the spring to the base section of the body. Of course, there are equivalent different ways to axially fasten the retainer ring to the shaft section the skilled person may readily choose from.

In preferred embodiments, the clutch ring and the clutch gear each have a clutch cam track extending peripherally and interacting with each other for controlling an angular coupling between the clutch ring and the clutch gear, the clutch cam track of the clutch ring having a plurality of clutch catches and the clutch cam track of the clutch gear having a plurality of clutch detents for engaging the clutch catches of the clutch ring or vice versa. The strength of the angular coupling between the clutch ring and the clutch gear is dependent on the biasing force of the spring and the shapes of the clutch detents and the clutch catches. For instance, both the clutch detents and the clutch catches may have corresponding inclined edges, i.e. peripheral slopes, in order to ease engaging and disengaging and provide a smooth transition between engagement and disengagement. The skilled person, hence, can easily choose a combination suitable for providing a desired angular coupling strength between the clutch ring and the clutch gear.

In further preferred embodiments the clutch ring is torque-proof and axially displaceable coupled to the shaft section, wherein the shaft section has at least one angular positioning groove extending axially and the clutch ring has at least one angular positioning ridge engaging the at least one angular positioning groove. The clutch ring, hence, provides the clutch gear with an angular coupling to the shaft section of the body. However, the angular coupling between the clutch gear and the shaft section of the body is not a torque-proof connection. Rather, the angular coupling between the clutch gear and the shaft section of the body depends on the chosen angular coupling strength between the clutch ring and the clutch gear.

A first end of each angular positioning groove opens into an axial face of the shaft section opposite to the base section and a second end of the angular positioning groove opposite to the first end ends at a distance from the base section. This configuration of the grooves is easy to manufacture and allows for an easy mounting of the actuator.

The actuator housing may have a through-hole being penetrated by the body and at least one mirror fastening means for detachably connecting a mirror housing of the rear view device thereto. The through-hole provides the actuator housing with a radial bearing. The mirror fastening means may, for instance, be formed as a threaded bore which a screw holding the mirror housing may be screwed into.

Preferably, the actuator housing is configured two-part and has a base part and a cover part being detachably connected to each other and forming the actuator housing, the base part and the cover part each having corresponding housing fastening means, wherein the through-hole and the at least one mirror fastening means are formed in the base part. The two-part configuration allows for easily assembling the actuator. The housing fastening means may be catch means and/or one or more screws.

In advantageous embodiments, the drive assembly is supported by and completely arranged within the actuator housing. These embodiments are very compact and easy to mount to both the base frame of the vehicle door and the mirror housing.

The actuator may have a mass in a range from 175 g to 190 g and preferably of 183 g. Thus, the actuator does not adversely affect an efficiency of the vehicle.

The actuator housing may have a height in a range from 60 mm to 90 mm, the height being measured in an axial direction, and/or the actuator housing may have a width in a range from 40 mm to 70 mm, the width being measured in a first radial direction, and/or the actuator housing may have a length or depth in a range from 60 mm to 100 mm, being measured in a second radial direction perpendicular to the first radial direction, and/or the cover part of the actuator housing may have a cylindrical section accommodating the shaft section of the body and having a diameter in a range from 7.5 mm to 30 mm. With these dimensions, the actuator may be easily accommodated also by small mirror housings which improve an efficiency of the vehicle.

An essential advantage of the actuator according to the invention is the small number of parts required for providing an automatic fold and lift function which also allows for a manual operation and over-folding. As a consequence, the actuator has a low mass and a simple structure and is efficient and easy to manufacture.

In another aspect, a rear view device includes an actuator according to the present disclosure.

In another aspect, a vehicle includes at least one rear view device according to the present disclosure.

The above listed embodiments can be used individually or in any combination to provide the device and the method in accordance with the invention.

BRIEF DESCRIPTION OF THE DRAWINGS

These and other aspects of the invention are shown in detail in the illustrations as follows.

DETAILED DESCRIPTION

Figure 1:
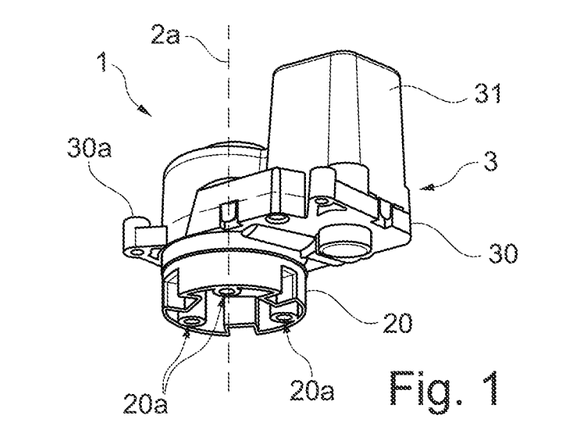
FIG. 1 is a schematic illustration of a perspective bottom view of an actuator according to an embodiment of the invention.

FIG. 1 shows a perspective bottom view of an actuator 1 according to an embodiment of the invention which may be used for mounting a rear view device (not shown) to a base frame of a door of a vehicle. The actuator 1 has a body 2 defining a folding axis 2a for a rear view device of a vehicle and is configured for being mounted on a right-hand side of the vehicle. The actuator 1 has a mass of 183 g which may be in a range from 175 g to 190 g for different embodiments.

The body 2 has a base section 20 with three base fastening means 20a for connecting the body 2 to the base frame of the door of the vehicle. The body 2 further has a shaft section 21 being arranged axially adjacent to the base section 20. The base section 20 and the shaft section 21 are integrally formed from a plastic and have a substantially cylindrical shape. Thereby, the base section 20 and the shaft section 21 differ by a diameter of the cylinder, wherein the base section has a larger diameter than the shaft section (see FIG. 9).

The actuator 1 further has an actuator housing 3 being rotatably and axially displaceably borne by the body 2. The actuator housing 3 has a through-hole 30e being penetrated by the body 2, i.e. the shaft section 21 extends through the through-hole 30e of the actuator housing 3 (see FIG. 9), and three mirror fastening means 30a for detachably connecting a mirror housing of the rear view device thereto. The actuator housing 3 is configured two-part and has a base part 30 and a cover part 31 being detachably connected to each other and forming the actuator housing 3 (see FIG. 9).

Figure 9:
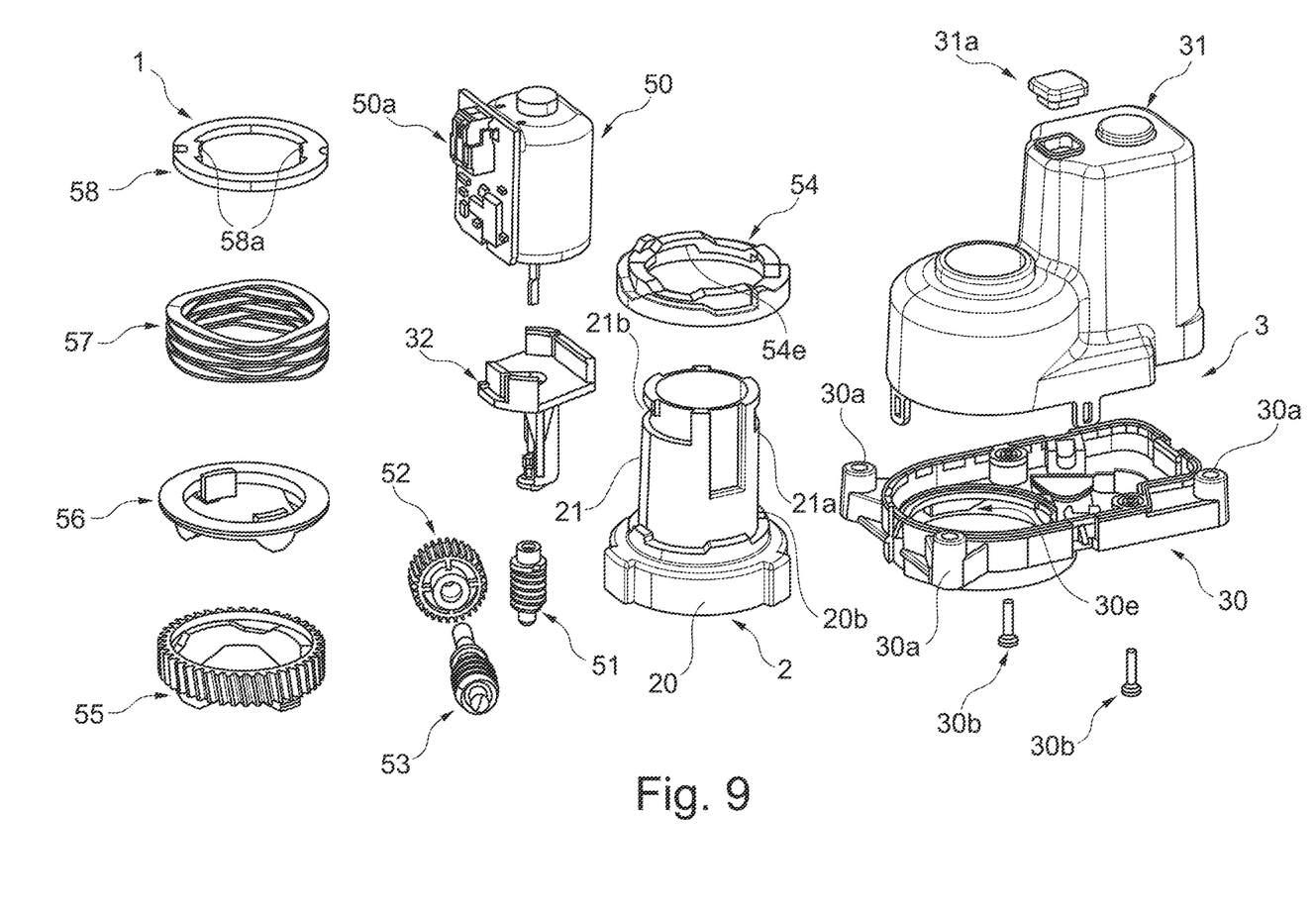
FIG. 9 is a schematic illustration of an exploded view of the actuator shown in FIG. 1.

The base part 30 and the cover part 31 each have corresponding housing fastening means, wherein the through-hole 30e and the three mirror fastening means 30a are formed in the base part 30 (see FIG. 9). The cover part 31 of the actuator housing 3 has a cylindrical section accommodating the shaft section 21 of the body and having a diameter of 17 mm, which may be in a range from 15 mm to 20 mm for different embodiments.

The actuator housing 3 has a height of for example 72 mm, the height being measured in the axial direction, which may be in a range from 60 mm to 90 mm for different embodiments. The actuator housing 3 has a width of for example 47 mm, the width being measured in a first radial direction, which may be in a range from 40 mm to 70 mm for different embodiments. The actuator housing 3 has a length or depth of for example 74 mm, being measured in a second radial direction perpendicular to the first radial direction, which may be in a range from 60 mm to 100 mm for different embodiments.

Figure 2:
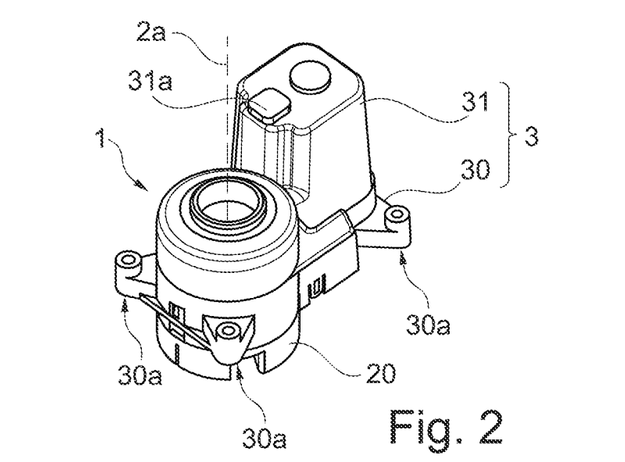
FIG. 2 is a schematic illustration of a perspective top view of the actuator shown in FIG. 1.

FIG. 2 shows a perspective top view of the actuator 1. The actuator housing 3 further has a grommet 31a for electrically connecting the actuator 1 to a bus system of the vehicle.

Figure 3:
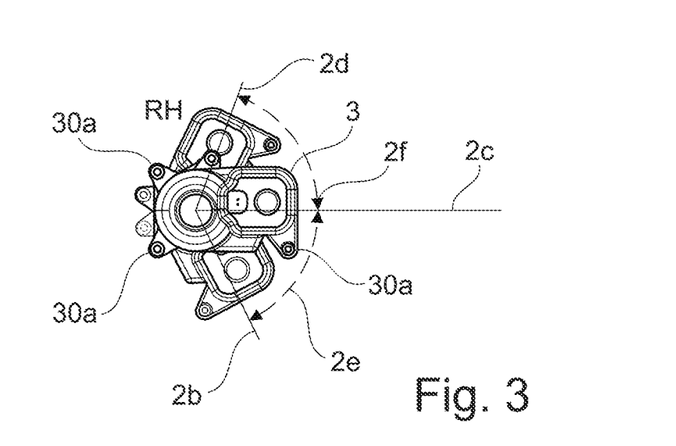
FIG. 3 is a schematic illustration of a top view of the actuator shown in FIG. 1 in a first angular position, a second angular position and a third angular position.

FIG. 3 shows a top view of the actuator 1 in a first angular position 2b, i.e. a folded position of the rear view device, a second angular position 2c, i.e. an unfolded position of the rear view device, and a third angular position 2d, i.e. an over-folded position of the rear view device. A first angular difference 2e between the first angular position 2b and the second angular position 2c is for example 75° and may be in a range from 20° to 90° for different embodiments. A second angular difference 2f between the first angular position 2b and the third angular position 2d is for example 165° and may be up to 240° for different embodiments.

Figure 4:
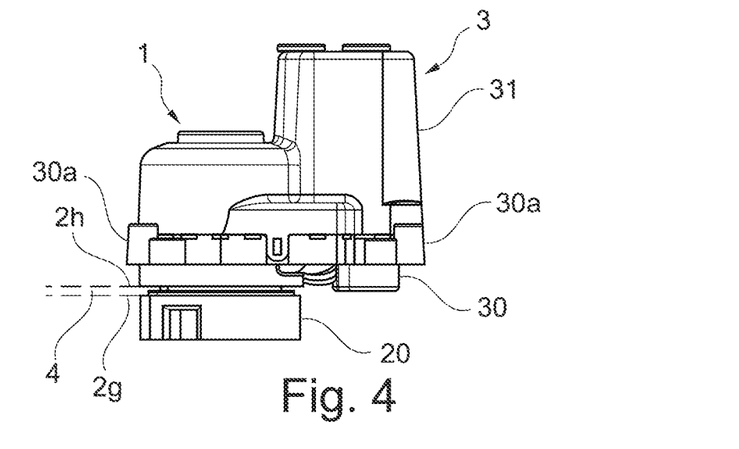
FIG. 4 is a schematic illustration of a lateral view of the actuator shown in FIG. 1.

FIG. 4 shows a lateral view of the actuator 1. The actuator housing 3 is in a second axial position 2h forming a gap 4 between the base part 30 of the actuator housing 3 and the base section 20 of the body 2. In a first axial position 2g, the base part 30 of the actuator housing 3 abuts the base section 20 of the body 2 substantially without any gap (see FIG. 1).

Figure 5:
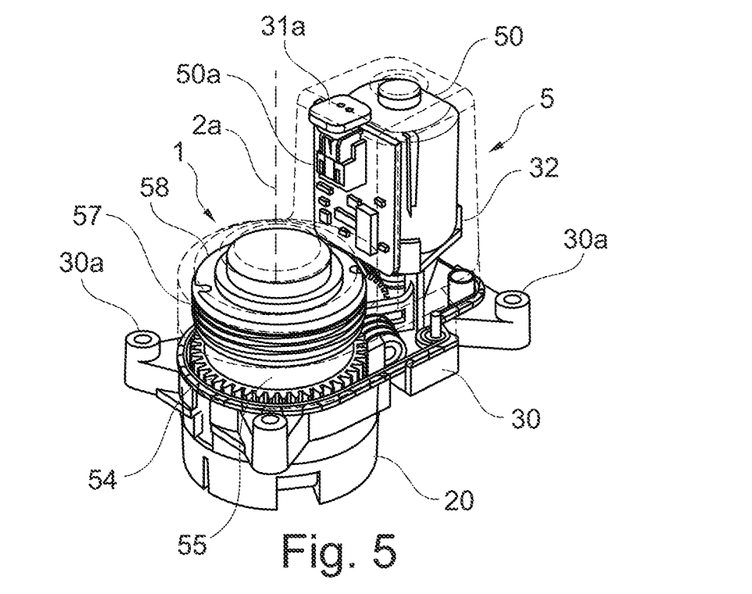
FIG. 5 is a schematic illustration of a perspective view of the actuator shown in FIG. 1 with the cover being removed.

FIG. 5 shows a perspective top view of the actuator 1 with the cover 31 of the actuator housing 3 removed for accessing the interior structure of the actuator 1. The actuator 1 has a drive assembly 5 being completely arranged within the actuator housing 3 and supported by the actuator housing 3, i.e. the actuator 1 is a so-called powerfold actuator. The drive assembly 5 is configured for automatically rotating the actuator housing 3 relative to the body 2 about the folding axis 2a between the first angular position 2b and the second angular position 2c and for axially displacing the actuator housing 3 relative to the body 2 along the folding axis 2a between the first axial position 2g and the second axial position 2h.

Apart from that, the actuator 1 is configured for manually rotating the actuator housing 3 between the first angular position 2b and the second angular position 2c and for manually rotating the actuator housing 3 between the second angular position 2c and the third angular position 2d. In other words, the drive assembly 5 is configured for also enabling the actuator 1 for being operated manually, i.e. by applying an external moment to the rear view device without any automatic operation of the drive assembly 5.

The drive assembly 5 has a drive train for automatically rotating the actuator housing 3 about the folding axis 2a and displacing the actuator housing 3 along the folding axis 2a between said first and second angular and axial positions 2b, 2c, 2g, 2h.

The drive train has an electric motor 50 and a printed circuit board 50a mounted and electrically connected to the electric motor 50 and the grommet 31a. A drive shaft of the electric motor 50 extends parallel to the folding axis 2a. The drive assembly 5 is configured to rotate the drive shaft of the electric motor 50 at an angular speed of for example 7500 rpm (rotations per minute), which may be in a range from 5500 rpm to 9500 rpm for different embodiments. The electric motor 50 is supported by a support element 32 of the actuator housing 3. The support element 32 is fastened to a bottom section of the actuator housing 3, i.e. to a bottom section of the base part 30 of the actuator housing 3.

The drive assembly 5 further has a retainer ring 58, a spring in form of a wave spring 57, a clutch ring 56 and a clutch gear 55. The clutch gear 55 is rotatably and axially displaceably borne by the body 2 and has at least one housing catch 55c (see FIG. 7) axially coupling the clutch gear 55 to the actuator housing 3 while, at the same time, allowing a relative rotation of the clutch gear 55 and the actuator housing 3. The clutch gear 55 comprises a metal and/or a plastic or consists of a metal and/or a plastic.

Figure 6:
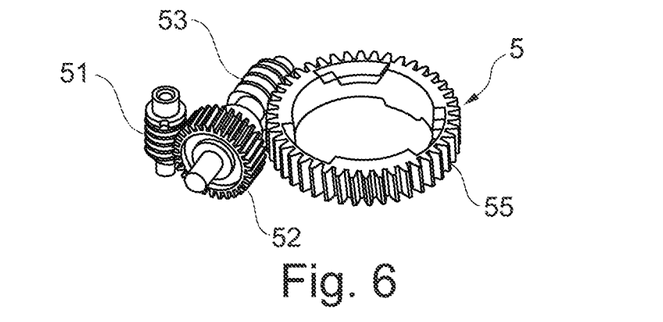
FIG. 6 is a schematic illustration of a perspective view of the gear train of the actuator shown in FIG. 1.

FIG. 6 shows a perspective partial view of the drive train of the actuator 1. The drive train, for rotatably coupling the clutch gear 55 to the electric motor 50, has a first worm gear 51 being torque-proof fastened to the drive shaft of the electric motor 50, a second worm gear 53 being engaged with the clutch gear 55, and a spur gear 52 being engaged with the first worm gear 51 and torque-proof fastened to the second worm gear 53. The first worm gear 51 comprises a plastic or consists thereof. The spur gear 52 comprises a plastic or consists thereof. The second worm gear 53 comprises a metal or consists thereof. The second worm gear 53 and the spur gear 52 are rotatable about an axis extending perpendicular to both the drive shaft and the folding axis 2a.

The drive train has a gear ratio of 1260:1 which may be in a range from 1000:1 to 1500:1 for different embodiments. Thus, the drive assembly 5 is configured to rotate the clutch gear 55 at an angular speed of for example 35,174°/s which may be in a range from 10°/s to 60°/s for different embodiments.

Figure 7:
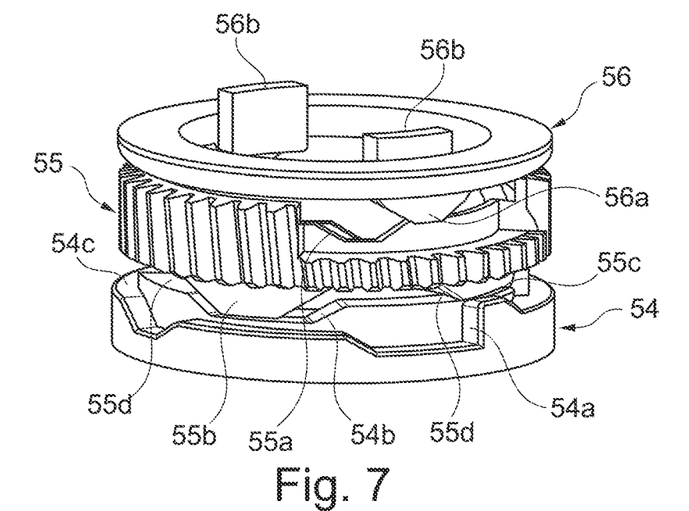
FIG. 7 is a schematic illustration of a perspective partial view of a drive assembly of the actuator shown in FIG. 1.

FIG. 7 shows a schematic illustration of a perspective partial view of the drive assembly 5 the actuator 1.

The body 2 and the clutch gear 55 each have a lifting cam track 54d, 55d extending peripherally around the body 2 and interacting with each other for defining a lifting stop and a lifting stroke. The lifting stroke determines the width of the gap 4 (see FIG. 4). The lifting cam track 54d of the body 2 has a lifting stop catch 54b and the lifting cam track 55d of the clutch gear 55 has a lifting stop detent 55b.

The lifting cam tracks 54d, 55d are radially arranged within folding cam tracks 30c, 54c of the actuator housing 3 and the body 2, respectively (see below). The lifting cam tracks 54d, 55d and the folding cam tracks 30c, 54c are also axially arranged at the same position. The lifting cam track 55*d* of the clutch gear 55 completely engages the lifting cam track 54*c* of the body 2, i.e. the lifting stop catch 54*b* engages the lifting stop detent 55*b* which corresponds to the first axial position 2*g* of the actuator housing 3.

The folding cam track 54*c* of the body 2 and the lifting cam track 54*d* of the body 2 are formed on a shaft cam ring 54 of the drive assembly 5. The shaft cam ring 54 is torque-proof connected to the body 2 by means of a plurality of angular positioning detents 54*e* of the shaft cam ring 54 engaging a plurality of matching angular positioning catches 20*b* of the body 2 (see FIG. 9).

The clutch ring 56 is torque-proof and axially displaceable coupled to the shaft section 21, wherein the shaft section 21 has two opposing angular positioning grooves 21*a* extending axially and the clutch ring 56 has two opposing angular positioning ridges 56*b* engaging the angular positioning groove 21*a*, respectively. A first end of each angular positioning groove 21*a* opens into an axial face of the shaft section 21 opposite to the base section 20 and a second end of the angular positioning groove 21*a* opposite to the first end ends at a distance from the base section 20.

The clutch ring 56 and the clutch gear 55 each have a clutch cam track extending peripherally and interacting with each other for controlling an angular coupling between the clutch ring 56 and the clutch gear 55. The clutch cam track of the clutch ring 56 has a plurality of clutch catches 56*a* and the clutch cam track of the clutch gear 55 has a plurality of clutch detents 55*a* for engaging the clutch catches 56*a* of the clutch ring 56. Of course, the clutch detents and the clutch catches may be associated reversely for different embodiments.

Figure 11:
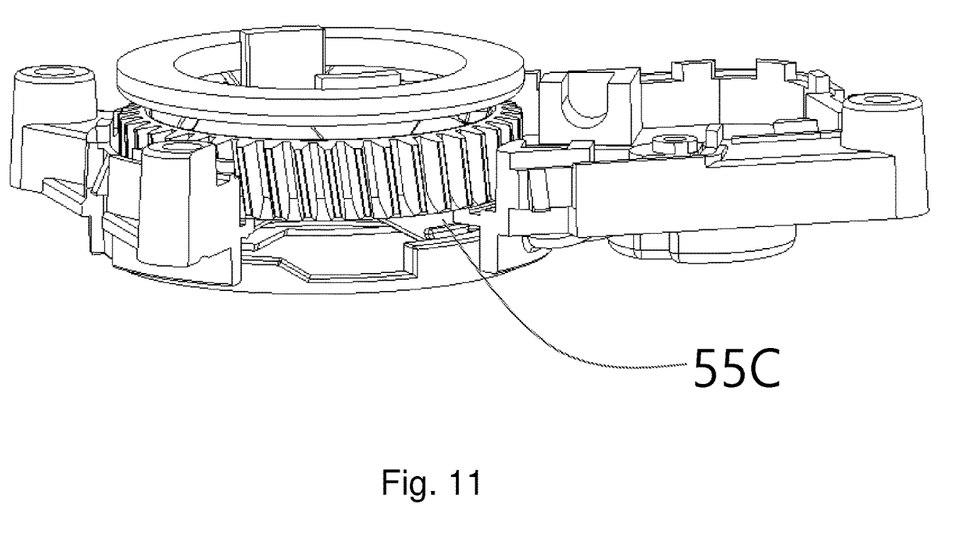
FIG. 11 is a schematic illustration of a prospective view of the housing catch coupling the clutch gear to the actuator housing.

Shortly summarized, the clutch gear 55 is the central part of the drive assembly having an outer helical gear for interacting with the drive train and forwarding a moment, a clutch cam track for interacting with the clutch ring 56 and controlling a relative angular position of the clutch gear 55 and the body 2, a lifting cam track 55*d* for interacting with the body 2 and controlling a relative axial position of the clutch gear 55 and the body 2 and a housing catch 55*c* for interacting with the actuator housing 3 (see FIG. 11) and controlling a relative axial position of the actuator housing 3 and the body 2, i.e. the clutch gear 55 is configured for four different interactions in total.

The retainer ring 58 is axially fastened to the shaft section 21 by a bayonet lock, the shaft section 21 having a bayonet mount 21*b* at an end of the shaft section 21 opposite to the base section 20 and the retainer ring 58 having a bayonet catch 58*a*. The wave spring 57 is supported between the retainer ring 58 and the clutch ring 56, thus biasing the clutch ring 56, the clutch gear 55 and the shaft cam ring 54 to the base section 20 of the body 2.

Figure 8:
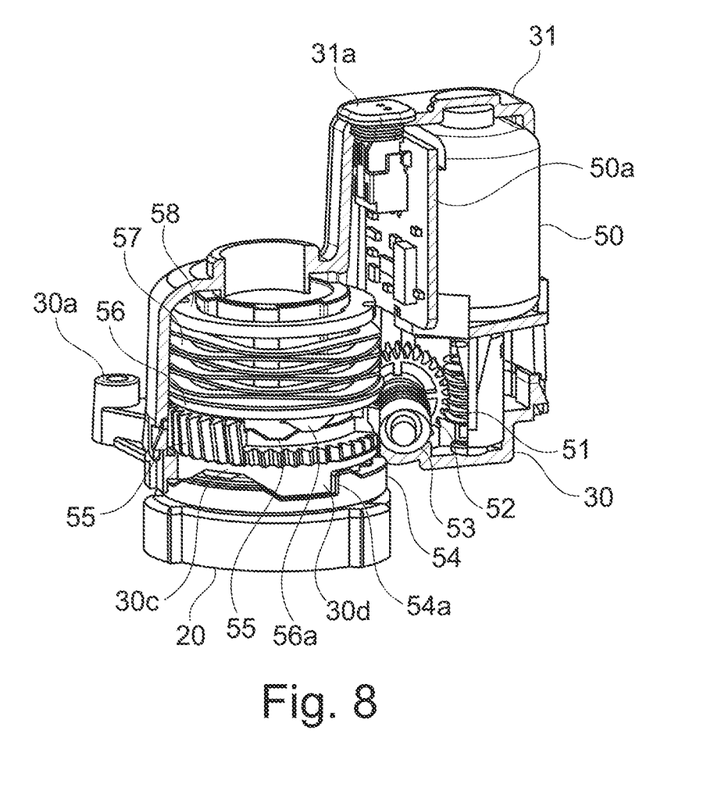
FIG. 8 is a schematic illustration of a partially cut perspective view of the actuator shown in FIG. 1.

FIG. 8 shows a partially cut perspective view of the actuator 1 with the actuator housing 3 in the second angular position 2*c*, i.e. the unfolded position of the rear view device.

The body 2, i.e. the shaft cam ring 54, and the actuator housing 3, i.e. the base part 30, each have a folding cam track 30*c*, 54*c* extending peripherally and interacting with each other for defining the second angular position 2*c* of the actuator housing 3. The folding cam track 54*c* of the body 2 has a folding stop detent 54*a* with a stop shoulder and an inclined edge, i.e. a peripheral slope, peripherally opposite to the stop shoulder wherein the stop shoulder axially exceeds the inclined edge. The folding cam track 30*c* of the actuator housing 3 has a folding stop catch 30*d* corresponding to the folding stop detent 54*a*. Angular positions of the stop shoulder of the folding stop detent 54*a* and the lifting stop catch 54*b* are distant from each other for providing a two-step fold and lift operation of the actuator 1. The folding stop catch 30*d* peripherally abuts the axially protruding stop shoulder of the folding stop detent 54*a*, and the folding cam track 30*c* of the actuator housing 3 completely engages the folding cam track 54*c* of the body 2 which corresponds to the first axial position 2*g* of the actuator housing 3.

FIG. 9 shows an exploded view of the actuator 1. The operation of the actuator 1 is as follows.

Unfolding the rear view device starts from the first angular position 2*b* of the actuator housing 3, i.e. from the folded position or parking position of the rear view device. In the first angular position 2*b* of the actuator housing 3 and during the automatic unfolding operation of the actuator 1, the lifting cam tracks 54*d*, 55*d* are disengaged and the clutch cam tracks are engaged keeping, by means of the clutch catch 56*a*, the actuator housing 3 in the second axial position 2*h* with the gap 4 between actuator housing 3 and the base section 20 of the body 2. This starting point is identical for an automatic and a manual operation of the actuator 1.

When the drive shaft of the electric motor 50 rotates for carrying out the automatic operation, a moment is applied to the clutch gear 55 by the drive train of the drive assembly 5. The moment rotates the actuator housing 3 to the second angular position 2*c*. The second angular position 2*c* is reached when the folding stop catch 30*d* of the actuator housing 3 abuts the stop shoulder of the folding stop detent 54*a* of the shaft cam ring 54, i.e. the body 2.

When the electric motor 50 keeps on rotating after the abutment of the folding stop catch 30*d* to the stop shoulder of the folding stop detent 54*d* the engagement of the clutch cam tracks is released against the biasing force of the wave spring 57. The clutch gear 55 is rotated relative to the actuator housing 3 and relative to the body 2 until the lifting stop detent 55*b* of the clutch gear 55 and the lifting stop catch 54*b* of the body 2 engage which engagement causes a displacement of the actuator housing 3 from the second axial position 2*h* to the first axial position 2*g* supported by the biasing force of the wave spring 57.

Apart from that, the engagement of the lifting stop detent 55*b* and the lifting stop catch 54*b*, via the drive train, applies a counteracting moment to the electric motor 50 causing a rise of an electric current used by the electric motor 50. The printed circuit board 50 permanently monitors the electric current used by the electric motor 50 and interrupts the electric current on said rise which makes the unfolding operation of the actuator 1 stop immediately.

Accordingly, automatically operating the rear view device is a two-step fold and lift operation of the actuator 1. First the actuator 1 pivots the actuator housing 3 from the first angular position 2*b* to the second angular position 2*c* without any axial displacement of the actuator housing 3. Second the actuator 1 displaces the actuator housing 3 to the first axial position 2*g* without any rotation of the actuator housing 3.

Automatic folding the rear view device starts from the unfolded position of the rear view device and is achieved reversing both the direction of rotation of the electric motor 50 and the order of the two steps of operation carried out by the actuator 1. First the actuator 1 displaces the actuator housing 3 to the second axial position 2*h* by disengaging the lifting cam tracks 55*d*, 54*d* and the folding cam tracks 30*c*, 54*c*. Second the actuator 1 pivots the actuator housing 3 from the second angular position 2*c* to the first angular position 2*b* without any axial displacement of the actuator housing 3.

During any manual operation of the actuator 1 neither the electric motor 50 nor the drive train rotate, i.e. a relative angular position of the clutch gear 55 and the actuator housing 3 is maintained at all times. In other words, any external moment applied to the actuator housing 3 is forwarded to the clutch gear 55 via the drive train of the drive assembly 5.

Manually over-folding the rear view device starts from the second angular position 2c of the actuator housing 3 where both the folding cam tracks 30c, 54c and the lifting cam tracks 54d, 55d are engaged. Applying an external moment to the unfolded rear view device working in a forward direction of the vehicle causes the lifting cam tracks 54d, 55d to disengage against the biasing force of the wave spring 57 thereby displacing the actuator housing 3 to the second axial position 2h. The second axial position 2h of the actuator housing 3 is maintained during the manual operation until the third angular position 2d has been reached. The third angular position 2d is defined by an engagement of the respective clutch cam tracks of the clutch gear 55 and the clutch ring 56, the actuator housing 3 and the body 2 being rotationally coupled in the third position 2d via the clutch ring 56 and the drive train of the drive assembly 5.

Pivoting the rear view device from the over-folded position back to the unfolded position reestablishes the engagement of the lifting cam tracks 54d, 55d displacing the actuator housing 3 from both from the third angular position 2d to the second angular position 2c and from the second axial position 2h to the first axial position 2g thereafter by means of the biasing force of the wave spring 57.

Apart from the automatic unfolding operation of the actuator 1 set forth above, the rear view device may be unfolded also manually from the folded position to the unfolded position by applying an external moment to the rear view device working in the forward direction of the vehicle. Due to the external moment the actuator housing 3 rotates until the folding stop catch 30d abuts the stop shoulder of the folding stop detent 54c. As the angular relation between the actuator housing 3 and the clutch gear 55 is maintained during rotation because of the inactivity of the electric motor 50, the clutch gear 55 also rotates relative to the body 2 and particularly relative to the shaft cam ring 54. When the actuator housing 3 has reached the second angular position 2c the lifting cam tracks 54d, 55d engage thereby displacing the actuator housing 3 to the first axial position 2b. The axial displacement of the actuator housing 3 is supported by the biasing force of the wave spring 57.

Manually folding the rear view device starts from the unfolded position of the rear view device. Applying an external moment to the rear view device working opposite to the forward driving direction of the vehicle, releases, at the same time, the engagements of the lifting cam tracks 54d, 55d and the folding cam tracks 30c, 54c wherein the disengagement of the folding cam tracks 30c, 54c is facilitated by the inclined edges of the folding stop catch 30 and the folding stop detent 54d. The actuator housing 3 is displaced to the second axial position 2h and rotated to the first angular position 2b.

Figure 10:
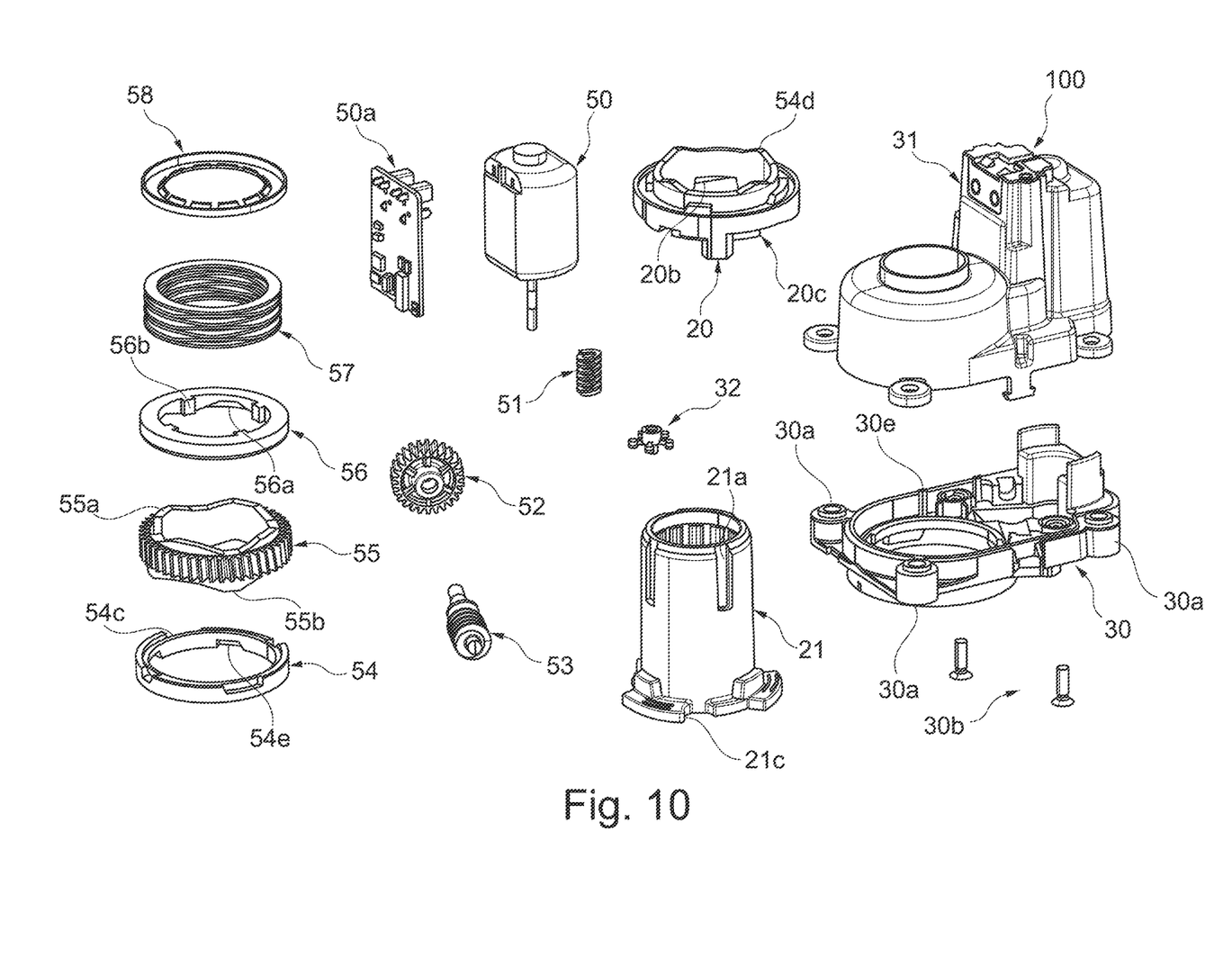
FIG. 10 is a schematic illustration of an exploded view of an actuator according to another embodiment of the invention.

FIG. 10 shows an actuator 100 for a rear view device of a vehicle according to another embodiment of the invention. The actuator 100 has the same basic structure as the actuator 1 shown in FIGS. 1 to 9. However, the actuator 100 differs from the actuator 1 by the following features.

First, the body 2 is configured two-part and the base section 20 and the shaft section 21 are separately formed and connected by a bayonet lock. The base section 20 has the bayonet mount 20a and the shaft section 21 has the bayonet catch 21c. In further embodiments the shaft section 21 has a bayonet catch while the base section 20 has a bayonet mount.

Second, the folding cam track 54c of the body 2 is formed on a shaft cam ring 54 of the drive assembly 5 and the lifting cam track 54d of the body 2 is formed on the body 2.

Third, the retainer ring 58 is axially fastened to the shaft section 21 by press-fitting, the shaft section 21 having a peripheral groove and the retainer ring 58 having a plurality of catches engaging the groove.

Fourth, the support element 32 is shaped differently for bearing a free end of the drive shaft of the electric motor 50.

The embodiments shown here are only examples of the present invention and must therefore not be understood as restrictive. Alternative embodiments considered by the skilled person are equally covered by the scope of protection of the present invention.

REFERENCE SIGNS 1 actuator
2 body
2a folding axis
2b first angular position
2c second angular position
2d third angular position
2e first angular difference
2f second angular difference
2g first axial position
2h second axial position
3 actuator housing
4 gap
5 drive assembly
20 base section
20a base fastening means
20b angular positioning catch
20c bayonet mount
21 shaft section
21a angular positioning groove
21b bayonet mount
21c bayonet catch
30 base part
30a mirror fastening means
30b housing fastening means
30c folding cam track
30d folding stop catch
30e through-hole
31 cover part
31a grommet
32 support element
50 electric motor
50a printed circuit board
51 first worm gear
52 spur gear
53 second worm gear
54 shaft cam ring
54a folding stop detent
54b lifting stop catch
54c folding cam track
54d lifting cam track
54e angular positioning detent
55 clutch gear
55a clutch detent
55b lifting stop detent
55c housing catch
55d lifting cam track
56 clutch ring 56a clutch catch
56b angular positioning ridge
57 wave spring
58 retainer ring
58a bayonet catch
100 actuator

What is claimed is:

1. An actuator for a rear view device of a vehicle, comprising:
   a body defining a folding axis for the rear view device relative to the vehicle;
   an actuator housing being rotatably and axially displaceably supported by the body and bodywork; and
   a drive assembly being supported by the actuator housing and being configured for automatically rotating the actuator housing relative to the body about the folding axis between a first angular position and a second angular position and for axially displacing the actuator housing relative to the body along the folding axis between a first axial position and a second axial position,
   wherein a clutch gear of the drive assembly is rotatably and axially displaceably supported by the body and has at least one housing catch axially coupling the clutch gear to the actuator housing while allowing a relative rotation of the clutch gear and the actuator housing, and
   wherein, in response to the actuator housing being in a second axial position, the actuator housing forms a gap between the actuator housing and a base section of the body.

2. The actuator according to claim 1, wherein the body and the actuator housing each have a folding cam track extending peripherally and interacting with each other for defining the second angular position, the folding cam track of the body having a folding stop catch with a shoulder and the folding cam track of the actuator housing having a folding stop detent.

3. The actuator according to claim 2, wherein the body and the clutch gear each have a lifting cam track extending peripherally and interacting with each other for defining a lifting stop and a lifting stroke, the lifting cam track of the body having a lifting stop catch and the lifting cam track of the clutch gear having a lifting stop detent.

4. The actuator according to claim 3, wherein angular positions of the folding stop catch and the lifting stop catch are distant from each other for providing a two-step fold and lift operation of the actuator.

5. The actuator according to claim 3, wherein the lifting cam tracks are radially arranged within at least one of the folding cam tracks and the lifting cam tracks, and the folding cam tracks are axially arranged at the same position.

6. The actuator according to claim 3, wherein the folding cam track of the body and the lifting cam track of the body are formed on a shaft cam ring of the drive assembly, or the folding cam track of the body is formed on a shaft cam ring of the drive assembly and the lifting cam track of the body is formed on the body.

7. The actuator according to claim 6, wherein the shaft cam ring is torque-proof connected to the body by means of a plurality of angular positioning detents of the shaft cam ring engaging a plurality of angular positioning catches of the body.

8. The actuator according to claim 1, wherein the body has a base section and a shaft section being arranged axially adjacent to the base section, the base section having at least one base fastening means for connecting the body to a base frame of at least one of a door of a vehicle and the shaft section extending through a through-hole of the actuator housing.

9. The actuator according to claim 8, wherein the base section and the shaft section are integrally formed, or the body is configured two-part and the base section and the shaft section are separately formed and connected by a bayonet lock, the base section having the bayonet mount and the shaft section having the bayonet catch or vice versa.

10. The actuator according to claim 8, wherein at least one of:
    the actuator housing has a height in a range from 60 mm to 90, the height being measured in an axial direction,
    the actuator housing has a width in a range from 40 mm to 70 mm, the width being measured in a first radial direction,
    the actuator housing has a length or depth in a range from 60 mm to 1000 mm, being measured in a second radial direction perpendicular to the first radial direction, and
    the cover part of the actuator housing has a cylindrical section accommodating the shaft section of the body and having a diameter in a range from 7.5 mm to 30 mm.

11. The actuator according to claim 1, wherein the drive assembly has a drive train for automatically rotating the actuator housing about the folding axis and displacing the actuator housing along the folding axis.

12. The actuator according to claim 11, wherein the drive train has an electric motor, a printed circuit board mounted and electrically connected to the electric motor and, for rotatably coupling the clutch gear to the electric motor, a first worm gear being torque-proof fastened to a drive shaft of the electric motor, a second worm gear being engaged with the clutch gear, and a spur gear being engaged with the first worm gear and torque-proof fastened to the second worm gear.

13. The actuator according to claim 12, wherein the drive shaft of the electric motor extends parallel to the folding axis and the second worm gear and the spur gear are rotatable about an axis extending perpendicular to both the drive shaft and the folding axis.

14. The actuator according to claim 12, wherein the electric motor is supported by a support element of the actuator housing, the support element being fastened to a bottom section of the actuator housing.

15. The actuator according to claim 12, wherein at least one of:
    the first worm gear comprises a plastic or consists thereof,
    the spur gear comprises a plastic or consists thereof,
    the second worm gear comprises a metal or consists thereof, and
    the clutch gear comprises one or more of a metal and a plastic or consists of a metal and a plastic.

16. The actuator according to claim 1, wherein at least one of
    the drive assembly is configured to rotate the drive shaft of the electric motor at an angular speed in a range from 5500 rpm to 9500 rpm,
    the drive train has a gear ratio in a range from 750:1 to 2000:1, and
    the drive assembly is configured to rotate the clutch gear at an angular speed in a range from 10°/s to 60°/s.

17. The actuator according to claim 1, wherein a first angular difference between the first angular position and the second angular position is in a range from 20° to 90°.

18. The actuator according to claim 1, wherein the actuator is configured for at least one of:

manually rotating the actuator housing between the second angular position and a third angular position, a second angular difference between the first angular position and the third angular position being up to 240°, and manually rotating the actuator housing between the first angular position and the second angular position.

19. The actuator according to claim 1, wherein the drive assembly has a retainer ring, a clutch ring and a spring, the spring being supported between the retainer ring and the clutch ring with the spring being a wave spring.

20. The actuator according to claim 19, wherein the retainer ring is axially fastened to the shaft section by a bayonet lock, the shaft section having a bayonet mount at an end of the shaft section opposite to the base section and the retainer ring having a bayonet catch, or the retainer ring is axially fastened to the shaft section by press-fitting, the shaft section having a peripheral groove and the retainer ring having a plurality of catches engaging the groove.

21. The actuator according to claim 20, wherein the clutch ring is torque-proof and axially displaceable coupled to the shaft section, and the shaft section has at least one angular positioning groove extending axially and the clutch ring has at least one angular positioning ridge engaging the at least one angular positioning groove.

22. The actuator according to claim 21, wherein a first end of each angular positioning groove opens into an axial face of the shaft section opposite to the base section and a second end of the angular positioning groove opposite to the first end ends at a distance from the base section.

23. The actuator according to claim 19, wherein the clutch ring and the clutch gear each have a clutch cam track extending peripherally and interacting with each other for controlling an angular coupling between the clutch ring and the clutch gear, the clutch cam track of the clutch ring having a plurality of clutch catches and the clutch cam track of the clutch gear having a plurality of clutch detents for engaging the clutch catches of the clutch ring or vice versa.

24. The actuator according to claim 1, wherein the actuator housing has a through-hole being penetrated by the body and at least one mirror fastening means for detachably connecting a mirror housing of the rear view device thereto.

25. The actuator according to claim 24, wherein the actuator housing is configured two-part and has a base part and a cover part being detachably connected to each other and forming the actuator housing, the base part and the cover part each having corresponding housing fastening means, wherein the through-hole and the at least one mirror fastening means are formed in the base part.

26. The actuator according to claim 1, wherein the drive assembly is supported by and completely arranged within the actuator housing.

27. The actuator according to claim 1, having a mass in a range from 175 g to 190 g, or having a mass of 183 g.

28. A rear view device, comprising:

an actuator for a rear view device of a vehicle, comprising:

a body defining a folding axis for the rear view device relative to the vehicle;

an actuator housing being rotatably and axially displaceably supported by the body and bodywork; and a drive assembly being supported by the actuator housing and being configured for automatically rotating the actuator housing relative to the body about the folding axis between a first angular position and a second angular position and for axially displacing the actuator housing relative to the body along the folding axis between a first axial position and a second axial position, wherein a clutch gear of the drive assembly is rotatably and axially displaceably supported by the body and has at least one housing catch axially coupling the clutch gear to the actuator housing while allowing a relative rotation of the clutch gear and the actuator housing, and wherein, in response to the actuator housing being in a second axial position, the actuator housing forms a gap between the actuator housing and a base section of the body.

29. A vehicle, comprising:

at least one rear view device comprising an actuator for a rear view device of a vehicle, comprising:

a body defining a folding axis for the rear view device relative to the vehicle;

an actuator housing being rotatably and axially displaceably supported by the body and bodywork; and a drive assembly being supported by the actuator housing and being configured for automatically rotating the actuator housing relative to the body about the folding axis between a first angular position and a second angular position and for axially displacing the actuator housing relative to the body along the folding axis between a first axial position and a second axial position, wherein a clutch gear of the drive assembly is rotatably and axially displaceably supported by the body and has at least one housing catch axially coupling the clutch gear to the actuator housing while allowing a relative rotation of the clutch gear and the actuator housing, and wherein, in response to the actuator housing being in a second axial position, the actuator housing forms a gap between the actuator housing and a base section of the body.

* * * * *